UNITED STATES PATENT OFFICE.

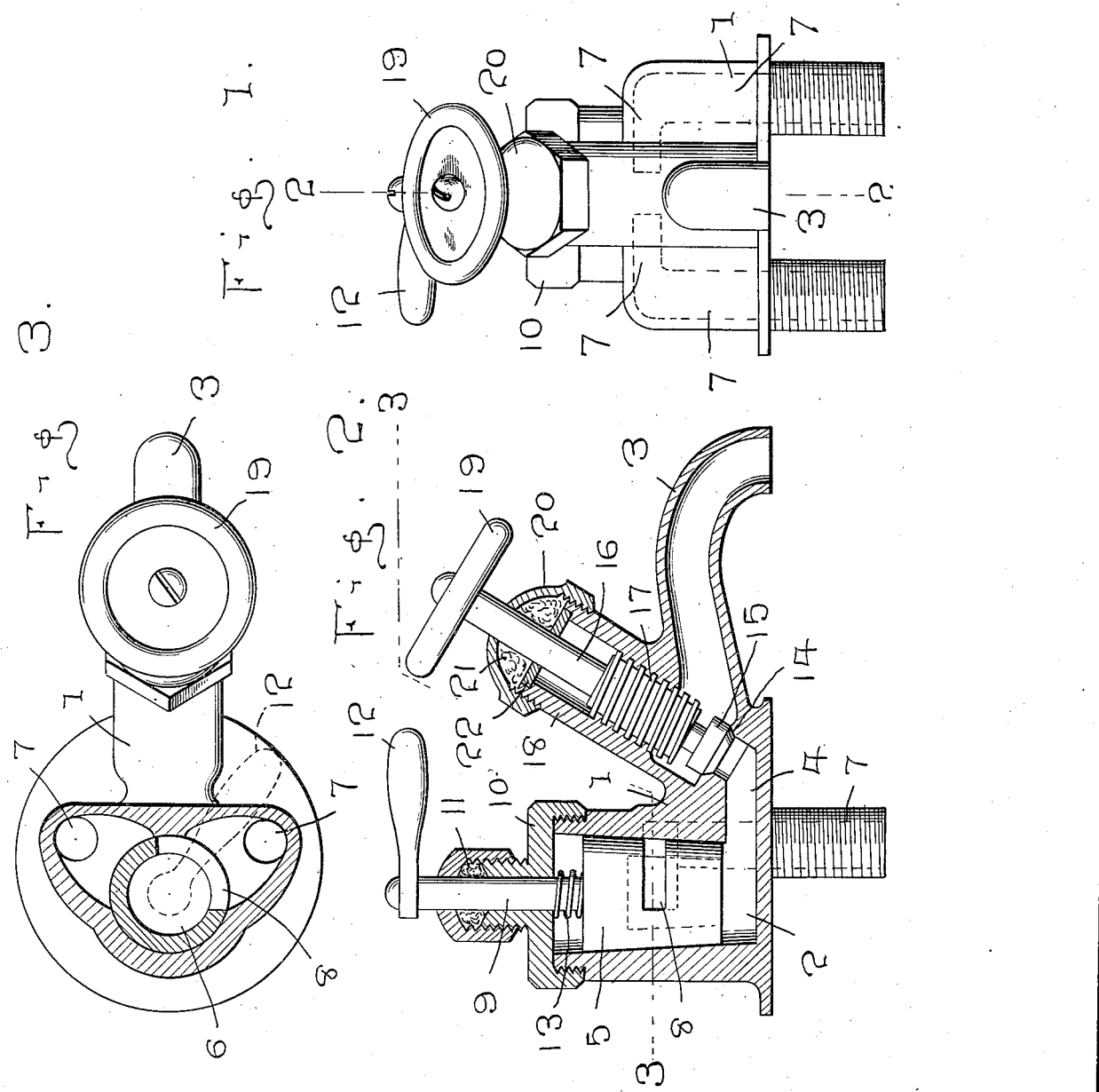

FRANK BARRINGTON HUNTER, OF MEMPHIS, TENNESSEE.

COMPOUND FAUCET.

938,868.  Specification of Letters Patent.  Patented Nov. 2, 1909.

Application filed August 11, 1908. Serial No. 447,999.

*To all whom it may concern:*

Be it known that I, FRANK BARRINGTON HUNTER, a citizen of the United States, residing at Memphis, in the county of Shelby and State of Tennessee, have invented certain new and useful Improvements in Compound Faucets; and I do hereby declare the following to be a full, clear, and exact description of the invention, such as will enable others skilled in the art to which it appertains to make and use the same.

This invention relates to new and useful improvements in compound faucets and it is an object of the invention to provide a novel device of this character wherein a mixing chamber is employed having an individual controlling valve, said mixing chamber being in communication with a bib having an individual controlling valve.

It is also an object of the invention to provide a novel device of this character wherein the hot and cold water may be admitted within the mixing chamber in the proportions desired or either the hot or cold water may be discharged independently of the other.

It is also an object of the invention to provide a novel device of this character which will be simple in construction, efficient and advantageous in practice and comparatively inexpensive to manufacture.

With the above and other objects in view the invention consists of the details of construction and in the novel arrangement and combination of parts to be hereinafter more particularly referred to.

In describing the invention in detail, reference will be had to the accompanying drawings forming part of this specification wherein like characters of reference denote corresponding parts in the several views and in which, Figure 1 is a view in front elevation of the invention. Fig. 2 is a sectional view taken on the line 2—2 of Fig. 1, and, Fig. 3 is a view taken on the line 3—3 of Fig. 2.

In the drawings, 1 denotes a casing of any desired material having formed therein the mixing chamber 2 which is in communication with a bib 3 through a port or passage-way 4, said passage-way 4 being positioned adjacent the base of the casing. Rotatably mounted within the mixing chamber 1 in its upper portion is a plug 5 having in its under surface a recess 6. In communication with the mixing chamber approximately centrally thereof are the inlet ports 7 adapted to be in communication with the hot and cold water supply pipes as is believed to be obvious. The inlet ports 7 at their junction with the mixing chamber are flared or enlarged and terminate in the same plane with an opening 8 in the plug 5, said opening 8 communicating with the recess 6. This opening 8 is arranged transversely of the plug 5 and extends around the plug 5 a distance slightly in excess of the flared mouths of the ports 7. The plug is connected to a stem 9 projecting through a removable cap 10 of the mixing chamber and through a suitable packing box 11 and has secured on its outer or projected end an operating handle or lever 12. By proper turning of this handle 12, the opening 8 can be brought into communication with either of the inlet ports 6 or can be so turned as to be in communication with both of the inlet ports and it is believed to be apparent that the proportions of the flow through the ports can readily be controlled or regulated by the proper adjustment of the plug 5 or more particularly the opening 8 therein with relation to the inlet ports 6. It is to be observed that the interior walls of the mixing chamber are tapered and that the plug 5 is correspondingly tapered and that said plug is held properly seated by the expansion spring 13 embracing the stem 9 abutting the upper face of the plug 5 and the cap 10.

The fluid passes from the mixing chamber 2 to the discharging bib 3 through the passage or port 4. At the junction of the port 4 with the bib 3 is formed a valve seat 14 having acting in conjunction therewith the valve 15 carried by a stem 16 having an intermediate threaded portion 17 engaging the threaded interior wall portion of a bonnet 18. This bonnet 18 is formed with the casing 1 and bib 3 and projects upwardly and forwardly so that the operating wheel 19 on the projected end of the stem 16 will in no way obstruct the movement of the handle 12. It is also to be observed that the bonnet 18 is provided with a removable cap 20 which has confined therein the packing 21 interposed between the cap and the plate 22.

I claim:

A device of the character described, comprising a casing having a mixing chamber therein, also additional flared chambers forming a continuation of said mixing chamber, and lateral inlet ports communicating with said flared additional chambers, said casing being formed with a bottom outlet passage extending laterally therefrom and communicating with said mixing chamber, a hollow plug arranged in said mixing chambers, means for actuating said plug, means for resiliently holding said plug in place, said plug having a lateral port communicating with said flared chambers, said plug having its bottom edge arranged about flush with the upper surface of said laterally extending outlet passage, said lateral port being adapted to separately register with either of said flared chambers or conjointly therewith.

In testimony whereof I have signed my name to this specification in the presence of two subscribing witnesses.

FRANK BARRINGTON HUNTER.

Witnesses:
H. B. HUNTER,
R. H. HUNTER.